United States Patent
Miyano et al.

(10) Patent No.: US 11,828,362 B2
(45) Date of Patent: Nov. 28, 2023

(54) SHIFT RANGE CONTROL DEVICE

(71) Applicant: DENSO CORPORATION, Kariya (JP)

(72) Inventors: Haruka Miyano, Kariya (JP); Kouji Sakaguchi, Kariya (JP); Jun Yamada, Kariya (JP); Seiji Nakayama, Kariya (JP)

(73) Assignee: DENSO CORPORATION, Kariya (JP)

( * ) Notice: Subject to any disclaimer, the term of this patent is extended or adjusted under 35 U.S.C. 154(b) by 66 days.

(21) Appl. No.: 17/708,450

(22) Filed: Mar. 30, 2022

(65) Prior Publication Data

US 2022/0221050 A1 Jul. 14, 2022

Related U.S. Application Data

(63) Continuation of application No. PCT/JP2020/035189, filed on Sep. 17, 2020.

(30) Foreign Application Priority Data

Oct. 1, 2019 (JP) .................................. 2019-181710

(51) Int. Cl.
*F16H 61/28* (2006.01)
*F16H 61/32* (2006.01)

(52) U.S. Cl.
CPC ......... *F16H 61/2807* (2013.01); *F16H 61/32* (2013.01); *F16H 2061/326* (2013.01)

(58) Field of Classification Search
CPC . F16H 61/2807; F16H 61/32; F16H 2061/326
See application file for complete search history.

(56) References Cited

U.S. PATENT DOCUMENTS

| | | | | |
|---|---|---|---|---|
| 2016/0298761 | A1* | 10/2016 | Noto | ........................ F16H 59/08 |
| 2017/0248229 | A1* | 8/2017 | Nakayama | ............. H02K 11/21 |
| 2017/0307072 | A1* | 10/2017 | Yamada | .................. F16H 61/32 |
| 2017/0307074 | A1* | 10/2017 | Yamada | .................. F16H 61/12 |
| 2019/0353242 | A1 | 11/2019 | Kamio | |

FOREIGN PATENT DOCUMENTS

| | | | | | |
|---|---|---|---|---|---|
| JP | H0781448 | A | * | 3/1995 | ............. F16H 61/28 |
| JP | 2007270920 | A | * | 10/2007 | ............. F16H 61/28 |

* cited by examiner

*Primary Examiner* — Tisha D Lewis
(74) *Attorney, Agent, or Firm* — Nixon & Vanderhye P.C.

(57) ABSTRACT

A shift range control device switches a shift range by controlling driving of a motor. The shift range control device calculate an actual rotation position of the motor. The shift range control device sets a target range according to a required range and a target rotation position according to the target range. The shift range control device controls the driving of the motor such that the actual rotation position reaches the target rotation position.

7 Claims, 11 Drawing Sheets

SHIFT RANGE CONTROL DEVICE

CROSS REFERENCE TO RELATED APPLICATIONS

The present application is a continuation application of International Patent Application No. PCT/JP2020/035189 filed on Sep. 17, 2020, which designated the U.S. and claims the benefit of priority from Japanese Patent Application No. 2019-181710 filed on Oct. 1, 2019. The entire disclosures of all of the above applications are incorporated herein by reference.

TECHNICAL FIELD

The present disclosure relates to a shift range control device.

BACKGROUND

A shift range control device for switching a shift range by controlling driving of a motor has been known. For example, when an angle deviation becomes smaller than an angle determination threshold value, a control is switched to a sudden braking control. For example, when reversal of the motor is detected, the control is switched to a stationary phase energization control.

SUMMARY

The present disclosure provides a shift range control device. The shift range control device switches a shift range by controlling driving of a motor. The shift range control device calculate an actual rotation position of the motor. The shift range control device sets a target range according to a required range and a target rotation position according to the target range. The shift range control device controls the driving of the motor such that the actual rotation position reaches the target rotation position.

BRIEF DESCRIPTION OF DRAWINGS

The features and advantages of the present disclosure will become more apparent from the following detailed description made with reference to the accompanying drawings. In the drawings.

DETAILED DESCRIPTION

In a shift range control device as an example, a stationary phase energization control is continued for a stationary phase energization time, and then the energization is turned off. Here, by making a range confirmation determination when the stationary phase energization is completed, it is possible to make a determination in a state where the motor is reliably stopped. However, for example, when a hydraulic control of a transmission is started after the range confirmation determination, it is preferable that the range confirmation determination is quick in terms of feeling. On the other hand, when the range confirmation is determined and the hydraulic control of the transmission is started while the motor is being driven, the transmission may fail in a case where the motor overshoots due to, for example, a momentary power interruption.

The present disclosure provides a shift range control device capable of appropriately determining a range confirmation.

An exemplary embodiment of the present disclosure provides a shift range control device. The shift range control device switches a shift range by controlling driving of a motor. The shift range control device includes a motor position calculation unit, a target setting unit, a drive control unit, a reversal determination unit, and a range confirmation determination unit. The motor position calculation unit is configured to calculate an actual rotation position based on a detection value of a rotation position detection unit that detects a rotation of the motor. The target setting unit is configured to set a target range according to a required range and a target rotation position according to the target range. The drive control unit is configured to control the driving of the motor such that the actual rotation position reaches the target rotation position, and perform a stop control that causes the motor to stop in response to the actual rotation position being within a control range including the target rotation position. The reversal determination unit configured to detect a reversal of the motor. The range confirmation determination unit is configured to determine that the shift range is confirmed according to the required range when the reversal of the motor is detected during the stop control.

In the exemplary embodiment of the present disclosure, the reversal determination unit detects the reversal of the motor. The range confirmation determination determines that the shift range is confirmed according to the required range when the reversal of the motor is detected during the stop control. As a result, it is possible to appropriately determine the confirmation of the shift range.

First Embodiment

Hereinafter, a shift range control device according to the present disclosure will be described with reference to the drawings. In a plurality of embodiments, the same reference marks are used for substantially the same elements, and description thereof will be omitted.

Figure 1:
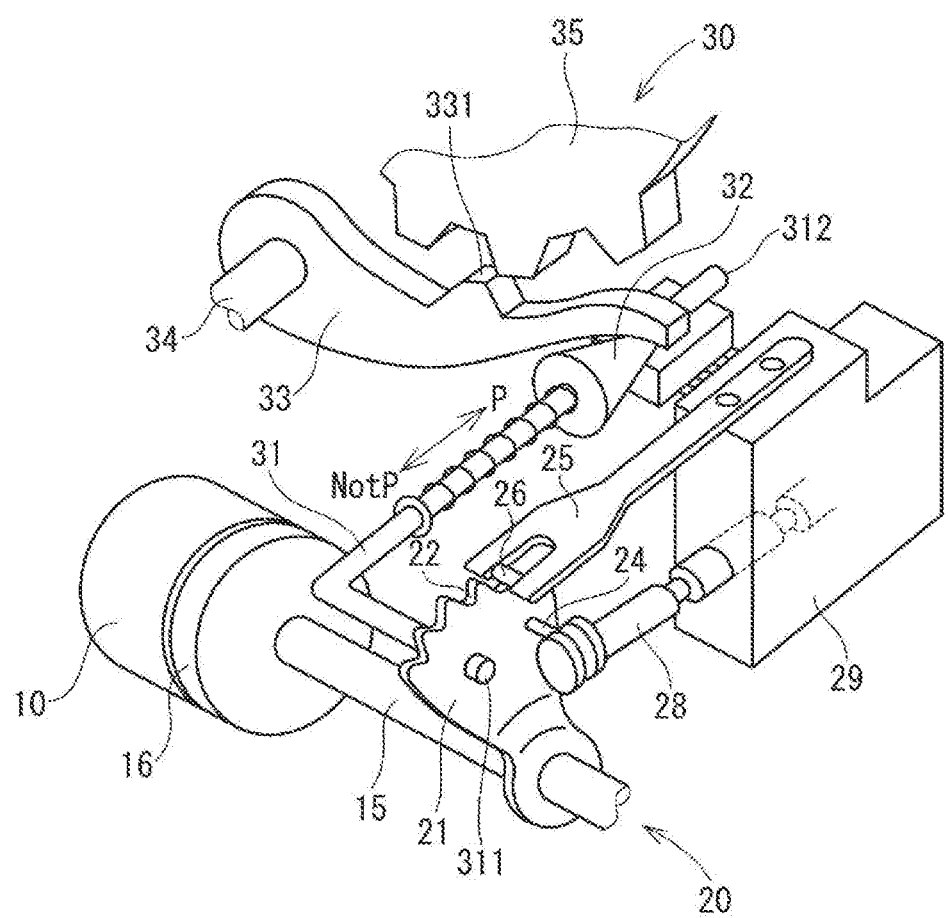
FIG. 1 is a perspective view showing a shift-by-wire system according to a first embodiment.
Figure 2:
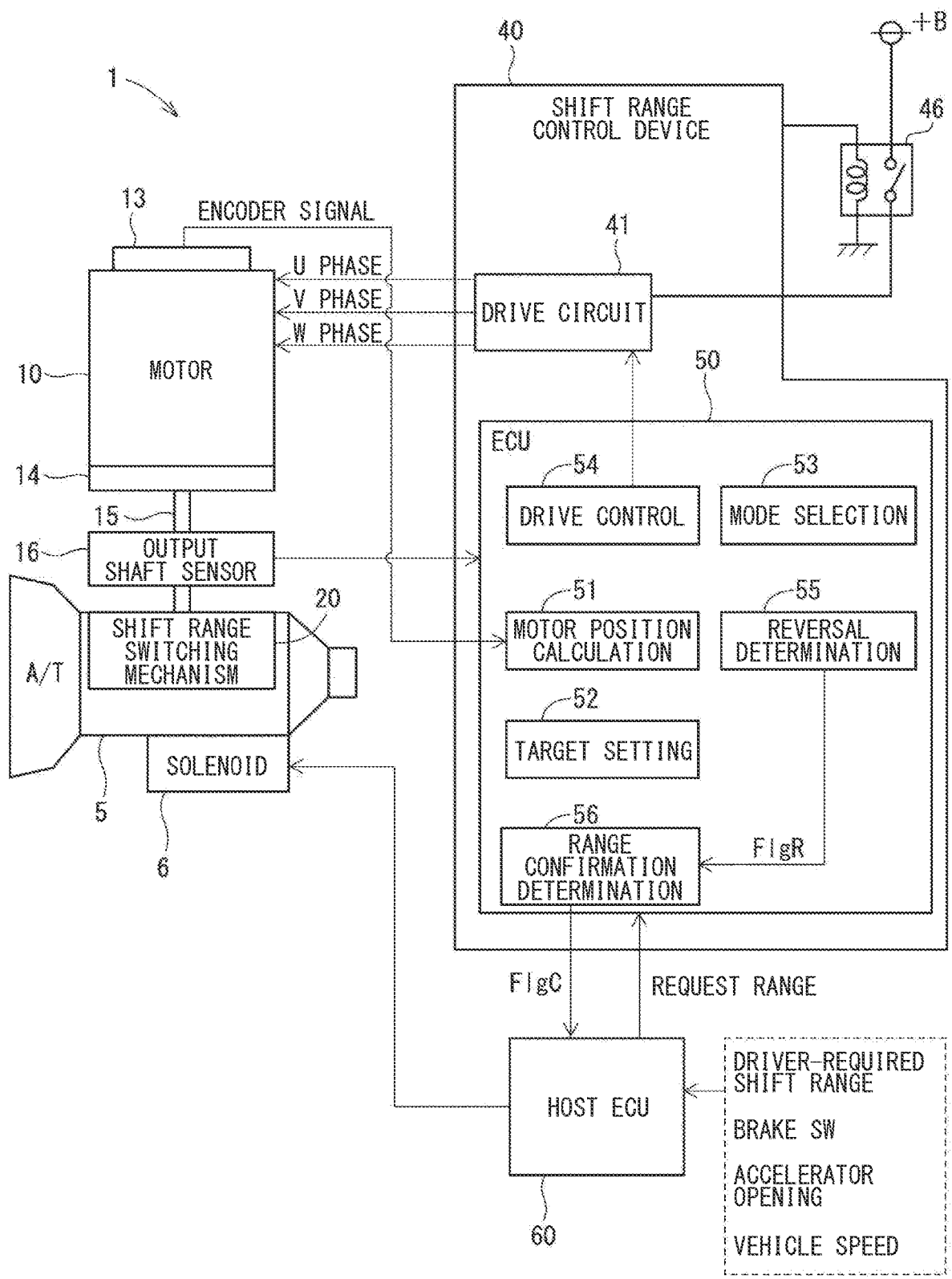
FIG. 2 is a diagram showing a schematic configuration of the shift-by-wire system according to the first embodiment.

A shift range control device according to one embodiment is shown in FIGS. 1 to 10. As shown in FIGS. 1 and 2, a shift-by-wire system 1 includes a motor 10, a shift range switching mechanism 20, a parking lock mechanism 30, a shift range control device 40, and the like.

The motor 10 rotates while receiving an electric power from a battery mounted on a vehicle (not shown), and functions as a driving source of the shift range switching mechanism 20. The motor 10 of the present embodiment is a switched reluctance motor having three phases and has U-phase, V-phase, and W-phase motor windings wound around a stator (not shown).

As shown in FIG. 2, an encoder 13, which is a rotational position detection unit, detects a rotational position of a rotor (not shown) of the motor 10. The encoder 13 is, for example, a magnetic rotary encoder, and includes a magnet that rotates integrally with the rotor, a Hall IC for magnetic detection, and the like. The encoder 13 outputs an encoder signal, which is a pulse signal, at predetermined angles in synchronization with the rotation of the rotor.

A speed reducer 14 is provided between a motor shaft 105 (see FIG. 6) of the motor 10 and an output shaft 15, decelerates the rotation of the motor 10, and outputs the rotation to the output shaft 15. As a result, the rotation of the motor 10 is transmitted to the shift range switching mechanism 20. The output shaft 15 is provided with an output shaft sensor 16 for detecting an angle of the output shaft 15. The output shaft sensor 16 is, for example, a potentiometer.

As shown in FIG. 1, the shift range switching mechanism 20 has a detent plate 21, a detent spring 25, a detent roller 26, and the like, and transmits a rotational driving force output from the speed reducer 14 to a manual valve 28 and a parking lock mechanism 30.

The detent plate 21 is fixed to the output shaft 15 and driven by the motor 10. The detent plate 21 has a pin 24 protruding in parallel with the output shaft 15. The pin 24 is connected to the manual valve 28. When the detent plate 21 is driven by the motor 10, the manual valve 28 reciprocates in an axial direction. In other words, the shift range switching mechanism 20 converts a rotational motion of the motor 10 into a linear motion and transmits the linear motion to the manual valve 28. The manual valve 28 is provided in a valve body 29. When the manual valve 28 reciprocates in the axial direction, a hydraulic supply path to a hydraulic clutch (not shown) is switched, and an engagement state of the hydraulic clutch is switched. In this way, the shift range is switched.

On a detent spring 25 side of the detent plate 21, four valley portions 22 corresponding to the P (parking), R (reverse), N (neutral), and D (drive) ranges are formed. The detent roller 26 moves in the valley portion 22 as the motor 10 is driven.

Figure 6:
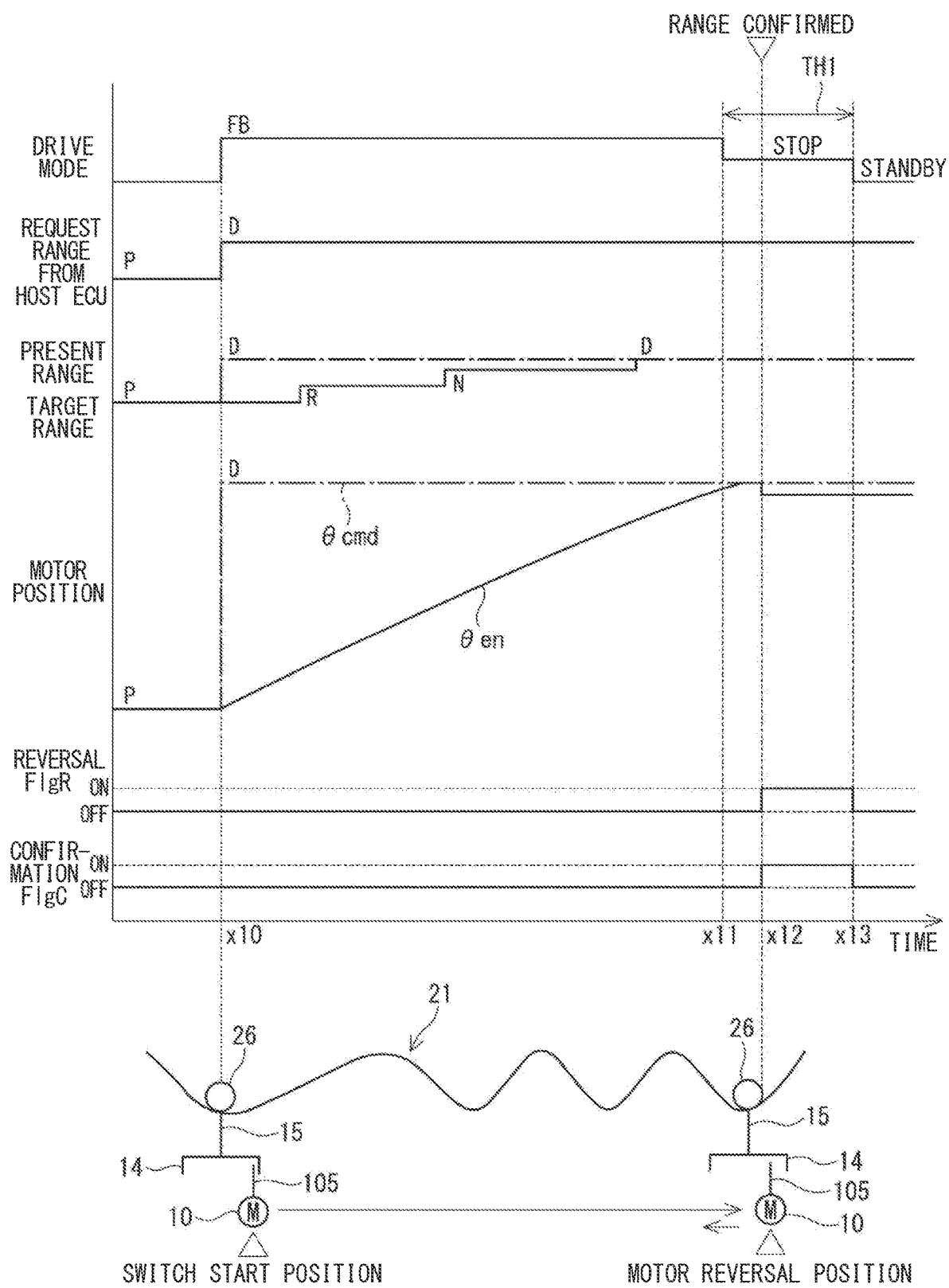
FIG. 6 is a time chart showing a motor control process and a schematic diagram showing a state in which a detent roller moves.

A play is formed between the motor shaft 105 and the output shaft 15. In FIG. 6, the speed reducer 14 and the output shaft 15 are integrated, and a play is formed between the motor shaft 105 and the speed reducer 14, but the motor shaft 105 and the speed reducer 14 may be integrated and a play may be formed between the speed reducer 14 and the output shaft 15. The "play" can be regarded as the total amount of plays provided between the motor shaft 105 and the output shaft 15.

The detent spring 25 is an elastically deformable plate-like urging member, and is provided with the detent roller 26 at a tip of the detent spring 25. The detent roller 26 is fitted into any one of the valley portions 22. The detent spring 25 urges the detent roller 26 toward the center of rotation of the detent plate 21. When a rotational force equal to or greater than a predetermined force is applied to the detent plate 21, the detent spring 25 is elastically deformed, and the detent roller 26 moves among the valley portions 22. When the detent roller 26 is fitted into any one of the valley portions 22, the swinging motion of the detent plate 21 is regulated, the axial position of the manual valve 28 and the state of the parking lock mechanism 30 are determined, and the shift range of an automatic transmission 5 is fixed.

The parking lock mechanism 30 includes a parking rod 31, a conical member 32, a parking lock pawl 33, a shaft part 34 and a parking gear 35. The parking rod 31 is formed in a substantially L-shape, and one end 311 is fixed to the detent plate 21. The other end 312 of the parking rod 31 is provided with the conical member 32. The conical member 32 is formed to reduce in diameter toward the other end 312. When the detent plate 21 rotates in the direction in which the detent roller 26 fits into the valley portion corresponding to the P range, the conical member 32 moves in the direction of the arrow P.

The parking lock pawl 33 comes into contact with a conical surface of the conical member 32 and is provided so as to be swingable around the shaft part 34. On the parking gear 35 side of the parking lock pawl 33, a protrusion 331 that can mesh with the parking gear 35 is provided. When the conical member 32 moves in the direction of the arrow P due to the rotation of the detent plate 21, the parking lock pawl 33 is pushed up and the protrusion 331 and the parking gear 35 mesh with each other. On the other hand, when the conical member 32 moves in the direction of the arrow NotP, the meshing between the protrusion 331 and the parking gear 35 is released.

The parking gear 35 is provided on an axle (not shown) and is enabled to mesh with the protrusion 331 of the parking lock pawl 33. When the parking gear 35 meshes with the protrusion 331, rotation of the axle is restricted. When the shift range is one of the ranges (Not P range) other than the P range, the parking gear 35 is not locked by the parking lock pawl 33. Therefore, the rotation of the axle 95 is not restricted by the parking lock mechanism 30. When the shift range is the P range, the parking gear 35 is locked by the parking lock pawl 33 and the rotation of the axle is restricted.

As shown in FIG. 2, the shift range control device 40 includes a drive circuit 41, an ECU 50, and the like. The drive circuit 41 is a three-phase inverter that switches the energization of the motor windings, has a switching element (not shown), and switches the energization of each phase of the motor 10. A motor relay 46 is provided between the drive circuit 41 and a battery. The motor relay 46 is turned on while a start switch of the vehicle, such as an ignition switch, is turned on, so that power is supplied to the motor 10 side. Further, by turning off the motor relay 46, the supply of electric power to the motor 10 side is cut off.

The ECU 50 is mainly composed of a microcomputer and the like, and internally includes a CPU, a ROM, a RAM, an I/O, a bus line for connecting these components, and the like, which are not shown. Each processing in the ECU 50 may be software processing by executing a program stored in advance in a tangible memory device (that is, a readable non-transitory tangible recording medium) such as the ROM by the CPU, or may be hardware processing by a dedicated electronic circuit. The same applies to a host ECU 60 described later.

The ECU 50 controls the switching of the shift range by controlling the drive of the motor 10 based on a driver required shift range, a signal from a brake switch, a vehicle speed, and the like. In the present embodiment, the ECU 50 acquires information such as a brake signal, a vehicle speed, and a required range from the host ECU 60. The ECU 50 includes a motor position calculation unit 51, a target setting unit 52, a mode selection unit 53, a drive control unit 54, a reversal determination unit 55, a range confirmation determination unit 56, and the like.

The motor position calculation unit 51 counts pulse edges of each phase of an encoder signal output from the encoder 13, and calculates an encoder count value θen. The encoder count value θen is a value corresponding to the rotation position of the motor 10 and corresponds to an "actual rotation position". In the present embodiment, the rotation direction of the motor 10 when switching from the P range to the D range is defined as a forward rotation, and the rotation direction of the motor 10 when switching from the D range to the P range is defined as a reverse rotation. The encoder count value θen is counted up when the motor 10 rotates in the forward rotation and is counted down when the motor 10 rotates in the reverse rotation.

The target setting unit 52 sets a target range according to the required range acquired from the host ECU 60. Further, a target count value θcmd, which is a position where the motor 10 is to be stopped, is set according to the target range. The mode selection unit 53 selects the drive mode.

The drive control unit 54 controls the drive of the motor 10 so that the detent roller 26 fits into the valley portion 22 according to the target range according to the selected drive mode. When the target range is changed, the drive control unit 54 drives the motor 10 by feedback control. In the drawing, the feedback is referred to as "F/B". Specifically, the motor 10 is rotated by energizing the energizing phase according to the encoder count value θen and switching the energizing phase according to the encoder count value θen.

When the encoder count value θen is within the control range including the target count value θcmd, the drive mode is switched from the feedback control to the stop control, and the motor 10 is stopped. The stop control of the present embodiment is a stationary phase energization control that continues energization to the same phase. In the present embodiment, after the stop control is performed over a stop control continuation time TH1, the drive mode is set to the standby mode, and the drive control of the motor 10 is terminated. The stop control continuation time TH1 is set in accordance with a time required to stop the motor 10. Hereinafter, when the encoder count value θen is within the control range including the target count value θcmd (for example, θcmd±2 counts), it is defined as "reaching the target".

The reversal determination unit 55 determines the reversal of the rotor of the motor 10 based on the encoder count value θen. Hereinafter, the reversal of the rotor of the motor 10 is simply referred to as "motor reversal". In the present embodiment, the rotation direction of the motor 10 is opposite to that at the time of feedback control, which is referred to as "motor reversal". The range confirmation determination unit 56 determines the range confirmation in the shift-by-wire system 1. When the range confirmation is determined, the range confirmation determination unit 56 transmits a range confirmation flag FlgC, which is information indicating that the range has been confirmed, to the host ECU 60.

The host ECU 60 controls the drive of a shift hydraulic control solenoid 6 based on the vehicle speed, an accelerator opening degree, the driver required shift range, and the like. In the present embodiment, when the driver required shift range changes and the range confirmation flag FlgC from the ECU 50 is turned on, the drive of the shift hydraulic control solenoid 6 is started. By controlling the shift hydraulic control solenoid 6, the shift stage is controlled. The number of the shift hydraulic control solenoids 6 is determined according to the number of shift stages or the like. Further, when the range confirmation flag FlgC is turned on, the host ECU 60 notifies the user of the confirmed range by, for example, changing the display of the instrument panel.

By the way, it is preferable in terms of feeling that the time from the change of the required shift range to the start of the hydraulic control of the automatic transmission 5 is short. On the other hand, if the hydraulic control is started while the motor 10 is being driven, an abnormality may occur in the automatic transmission 5 in a case where the motor 10 overshoots or undershoots due to, for example, a momentary power interruption.

Here, when the reversal of the motor 10 is detected while the detent roller 26 is located at the valley portion 22 according to the required range, overshoot does not occur and the detent roller 26 can be located at the valley portion 22 according to the required range. Therefore, in the present embodiment, the range is confirmed based on the reversal determination of the motor 10 during the stop control, so that the timing of start of the hydraulic control of the automatic transmission 5 is made as early as possible.

Figure 3:
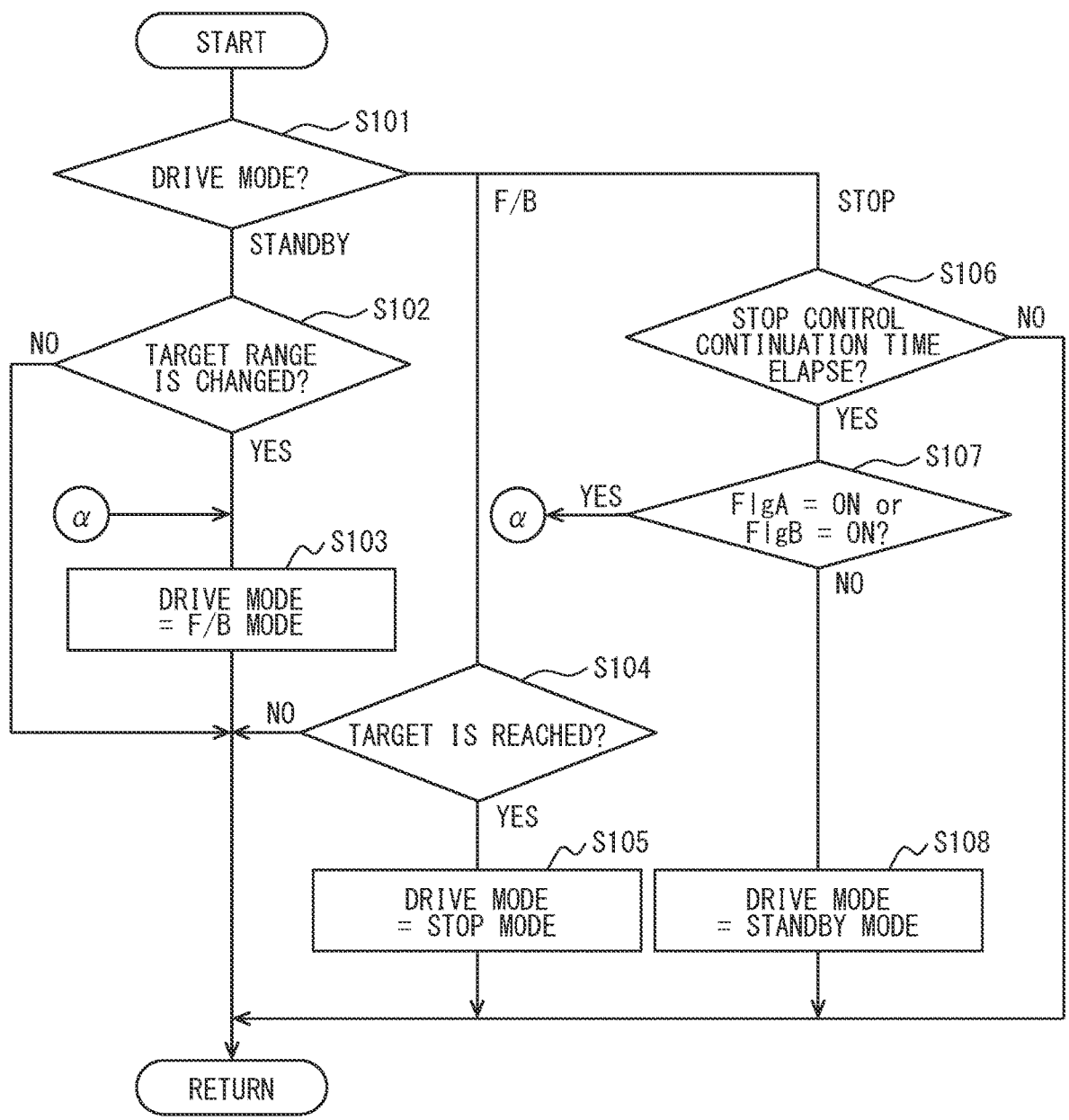
FIG. 3 is a flowchart showing a drive mode selection process according to the first embodiment.

This drive mode selection process in the present embodiment will be described with reference to a flowchart of FIG. 3. This process is executed in a predetermined cycle (for example, 1 [ms]) by, for example, the mode selection unit 53 of the ECU 50. A part of the process may be executed by another calculation unit of the ECU 50. The same applies to other control processes. Further, the calculation cycle may be the same or different for each process. Hereinafter, "step" in step S101 is omitted, and is simply referred to as a symbol "S." The other steps are the same.

In S101, the mode selection unit 53 determines the current drive mode. When the drive mode is the standby mode, the process proceeds to S102, when the drive mode is the feedback mode, the process proceeds to S104, and when the drive mode is the stop mode, the process proceeds to S106.

In S102, the mode selection unit 53 determines whether the target range has been switched. When it is determined that the target range has not been switched (S102: NO), the standby mode is continued. When it is determined that the target range has been changed (S102: YES), the process proceeds to S103 and the drive mode is switched to the feedback mode.

In S104, to which the process proceeds when the drive mode is the feedback mode, the mode selection unit 53 determines whether the encoder count value θen has reached the target based on the encoder count value θen and the target count value θcmd. When the mode selection unit 53 determines that the target has not been reached (S104: NO), the feedback mode is continued. When the mode selection unit 53 determines that the target has been reached (S104: YES), the process proceeds to S105 and the drive mode is switched to the stop mode.

In S106, to which the process proceeds when the drive mode is the feedback mode, the mode selection unit 53 determines whether the stop control continuation time TH1 has elapsed after switching to the stop mode. When the mode selection unit 53 determines that the stop control continuation time TH1 has not elapsed (S106: NO), the stop mode is continued. When the mode selection unit 53 determines that the stop control continuation time TH1 has elapsed (S106: YES), the process proceeds to S107.

In S107, the mode selection unit 53 determines whether a re-feedback flag FlgA or a target reset flag FlgB, which will be described later, is on. When the mode selection unit 53 determines that the re-feedback flag FlgA or the target reset flag FlgB is on (S107: YES), the process returns to S102 and the drive mode is switched to the feedback mode. When the target reset flag FlgB is on, the target range and the target count value θcmd according to the required range are reset. When the mode selection unit 53 determines that both the re-feedback flag FlgA and the target reset flag FlgB are off (S107: NO), the process proceeds to S108 and the drive mode is set to the standby mode.

Figure 4:
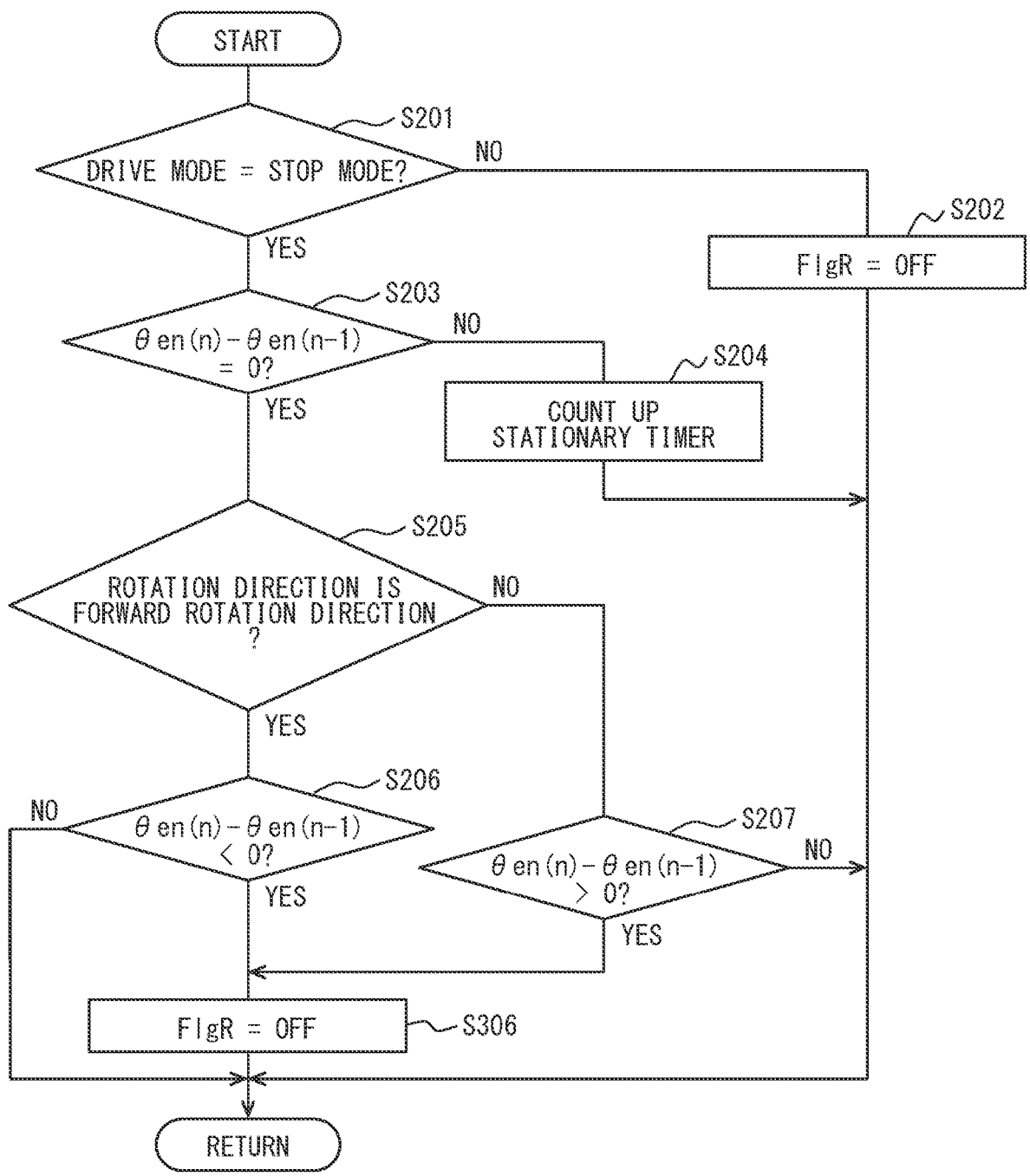
FIG. 4 is a flowchart showing a reversal detection process according to the first embodiment.

A reversal detection process will be described with reference to the flowchart of FIG. 4. This process is executed in a predetermined cycle (for example, 1 [ms]) by, for example, the reversal determination unit 55 of the ECU 50. In S201, the reversal determination unit 55 determines whether the drive mode is the stop mode. When the reversal determination unit 55 determines that the drive mode is not the stop mode (S201: NO), the process proceeds to S202 and the reversal flag FlgR is turned off. When the reversal determination unit 55 determines that the drive mode is the stop mode (S201: YES), the process proceeds to S203.

In S203, the reversal determination unit 55 determines whether the value obtained by subtracting the previous value from the current value of the encoder count value θen is 0. Here, when the current value of the encoder count value θen is equal to the previous value, a positive determination is made. In the figure, the subscript (n) means the current value, and (n−1) means the previous value. When the reversal determination unit 55 determines that the value obtained by subtracting the previous value from the current value of the encoder count value θen is 0 (S203: YES), the process proceeds to S204, and a stationary timer that measures an encoder stationary time T2 is counted up. When the reversal determination unit 55 determines that the value obtained by subtracting the previous value from the current value of the encoder count value θen is not 0 (S203: NO), the process proceeds to S205.

In S205, the reversal determination unit 55 determines whether the rotation direction of the motor 10 in the feedback mode before entering the stop mode is the forward rotation direction. When the reversal determination unit 55 determines that the rotation direction of the motor 10 is the forward rotation direction (S205: YES), the process proceeds to S206, and when the reversal determination unit 55 determines that the rotation direction of the motor 10 is the reverse rotation direction (S205: NO), the process proceeds to S207.

In S206, the reversal determination unit 55 determines whether the value obtained by subtracting the previous value from the current value of the encoder count value θen is a negative value. Here, when the current value of the encoder count value θen is smaller than the previous value, a positive determination is made. When the reversal determination unit 55 determines that the value obtained by subtracting the previous value from the current value of the encoder count value θen is greater than 0 (S206: NO), the motor 10 is not reversed. Thus, S208 is not performed and the routine is terminated. When the reversal determination unit 55 determines that the value obtained by subtracting the previous value from the current value of the encoder count value θen is a negative value (S206: YES), the process proceeds to S208 and the reversal flag FlgR is turned on.

In S207, the reversal determination unit 55 determines whether the value obtained by subtracting the previous value from the current value of the encoder count value θen is a positive value. Here, when the current value of the encoder count value θen is greater than the previous value, a positive determination is made. When the reversal determination unit 55 determines that the value obtained by subtracting the previous value from the current value of the encoder count value θen is smaller than 0 (S207: NO), the motor 10 is not reversed. Thus, S208 is not performed and the routine is terminated. When the reversal determination unit 55 determines that the value obtained by subtracting the previous value from the current value of the encoder count value θen is a positive value (S207: NO), the process proceeds to S208 and the reversal flag FlgR is turned on.

Figure 5:
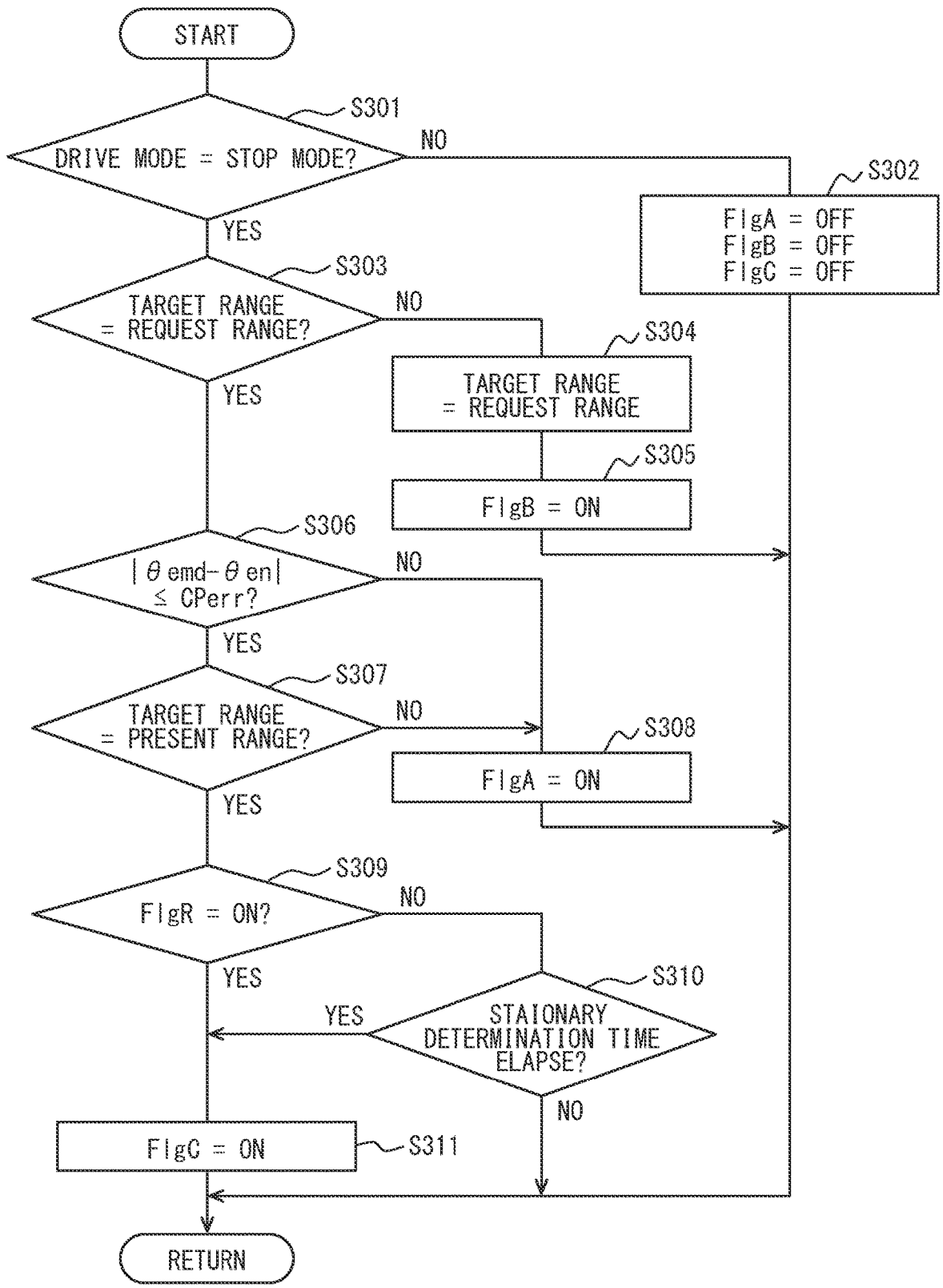
FIG. 5 is a flowchart showing a control selection process according to the first embodiment.

A control selection process will be described with reference to the flowchart of FIG. 5. This process is executed in a predetermined cycle (for example, 1 [ms]) by, for example, the range confirmation determination unit 56 of the ECU 50. In S301, the range confirmation determination unit 56 determines whether the drive mode is the stop mode. When the range confirmation determination unit 56 determines that the drive mode is not the stop mode (S301: NO), the process proceeds to S302, and the re-feedback flag FlgA, the target reset flag FlgB, and the range confirmation flag FlgC are turned off. When the reversal determination unit 55 determines that the drive mode is the stop mode (S301: YES), the process proceeds to S303.

In S303, the range confirmation determination unit 56 determines whether the target range matches with the required range. When the range confirmation determination unit 56 determines that the target range does not match with the required range (S303: NO), the process proceeds to S304, the target range is reset to match with the required range, and the target reset flag FlgB is turned on in S305. When the range confirmation determination unit 56 determines that the target range matches with the required range (S303: YES), the process proceeds to S306.

In S306, the range confirmation determination unit 56 determines whether the count deviation ΔCP, which is the absolute value of the difference between the target count value θcmd and the encoder count value θen, is equal to or less than a re-drive determination value CPerr. The re-drive determination value CPerr is set again according to the position where the motor 10 needs to be driven. When the range confirmation determination unit 56 determines that the count deviation ΔCP is greater than the re-drive determination value CPerr (S306: NO), the process proceeds to S308 and the re-feedback flag FlgA is turned on. When the range confirmation determination unit 56 determines that the count deviation ΔCP is equal to or less than the re-drive determination value CPerr (S306: YES), the process proceeds to S307.

In S307, the range confirmation determination unit 56 determines whether the target range matches with the current range. When the range confirmation determination unit 56 determines that the target range does not match with the current range (S307: NO), the process proceeds to S308 and the re-feedback flag FlgA is turned on. When the range confirmation determination unit 56 determines that the target range matches with the current range (S307: YES), the process proceeds to S309.

In S309, the range confirmation determination unit 56 determines whether the reversal flag FlgR is on. When the range confirmation determination unit 56 determines that the reversal flag is on (S309: YES), the process proceeds to S311. When the range confirmation determination unit 56 determines that the reversal flag is off (S308: NO), the process proceeds to S310.

In S310, the range confirmation determination unit 56 determines whether the stationary determination time TH2 has elapsed since the encoder count value θen has unchanged. The stationary determination time TH2 is set shorter than the stop control continuation time TH1. When the range confirmation determination unit 56 determines that the stationary determination time TH2 has not elapsed since the encoder count value θen has unchanged (S310: NO), the process of S311 is not performed and this routine is terminated. When the range confirmation determination unit 56 determines that the stationary determination time TH2 has elapsed since the encoder count value θen has unchanged (S310: YES), the process proceeds to S311 and the range determination flag FlgC is turned on. Further, the range confirmation determination unit 56 transmits the range confirmation flag FlgC to the host ECU 60.

The motor control process will be described based on time charts shown in FIGS. 6 to 10. The time chart of FIG. 6 shows the drive mode, the range required from the host ECU 60, the current range and the target range, the motor position, the reversal flag FlgR, and the range confirmation flag FlgC from the top, with the common time axis as the horizontal axis. In FIG. 6, the target range and the target count value θcmd are shown by a dash-dot line, and the current range and the encoder count value θen are shown by a solid line. The same applies to FIG. 7 and later. Further, on the lower side of the time chart of FIG. 6, the rotation direction of the motor 10 is set to the left-right direction on the paper surface, and the state in which the detent roller 26 moves the detent plate 21 is schematically shown.

When the driver's required shift range is switched from the P range to the D range by the driver's shift operation at time x10, information that the required range is set to the D range is transmitted from the host ECU 60 to the ECU 50. The ECU 50 sets the target range to the D range and sets the target count value θcmd according to the target range. Further, the ECU 50 switches the drive mode from the standby mode to the feedback mode, and drives the motor 10 so that the encoder count value θen reaches the target count value θcmd. As a result, the detent roller 26 moves from the valley portion corresponding to the P range to the valley portion corresponding to the D range.

When the encoder count value θen reaches the target at time x11, the drive mode is switched from the feedback mode to the stop mode. Further, when the reversal of the motor 10 is detected at time x12 in the stop mode, the reversal flag FlgR is turned on. When the motor 10 is reversed while the stop control is being performed, the motor 10 does not overshoot, so that the detent roller 26 can be reliably held in the valley corresponding to the D range. Therefore, in the present embodiment, the range confirmation flag FlgC is turned on at time x12 and transmitted to the host ECU 60. In the host ECU 60, when the range confirmation flag FlgC is turned on, the hydraulic control of the automatic transmission 5 is started. In addition, the range display of the instrument panel or the like is switched to the D range.

At time x13 when the stop control continuation time TH1 elapses from time x11 when the stop control is started, the stop control is terminated and the standby mode is entered. Also, the reversal flag FlgR and the range confirmation flag FlgC are turned off. As a result, the range is fixed at time x13 when the stop control is completed, and the start of the hydraulic pressure control can be accelerated as compared with the case where the hydraulic pressure control of the automatic transmission 5 is started, which contributes to the improvement of the feeling.

Each of the time charts of FIGS. 7 to 10 shows the drive mode, the range required from the host ECU 60, the current range and the target range, the motor position, the reversal flag FlgR, the range confirmation flag FlgC, the re-feedback flag FlgA, and the target reset flag FlgB from the top, with the common time axis as the horizontal axis.

Figure 7:
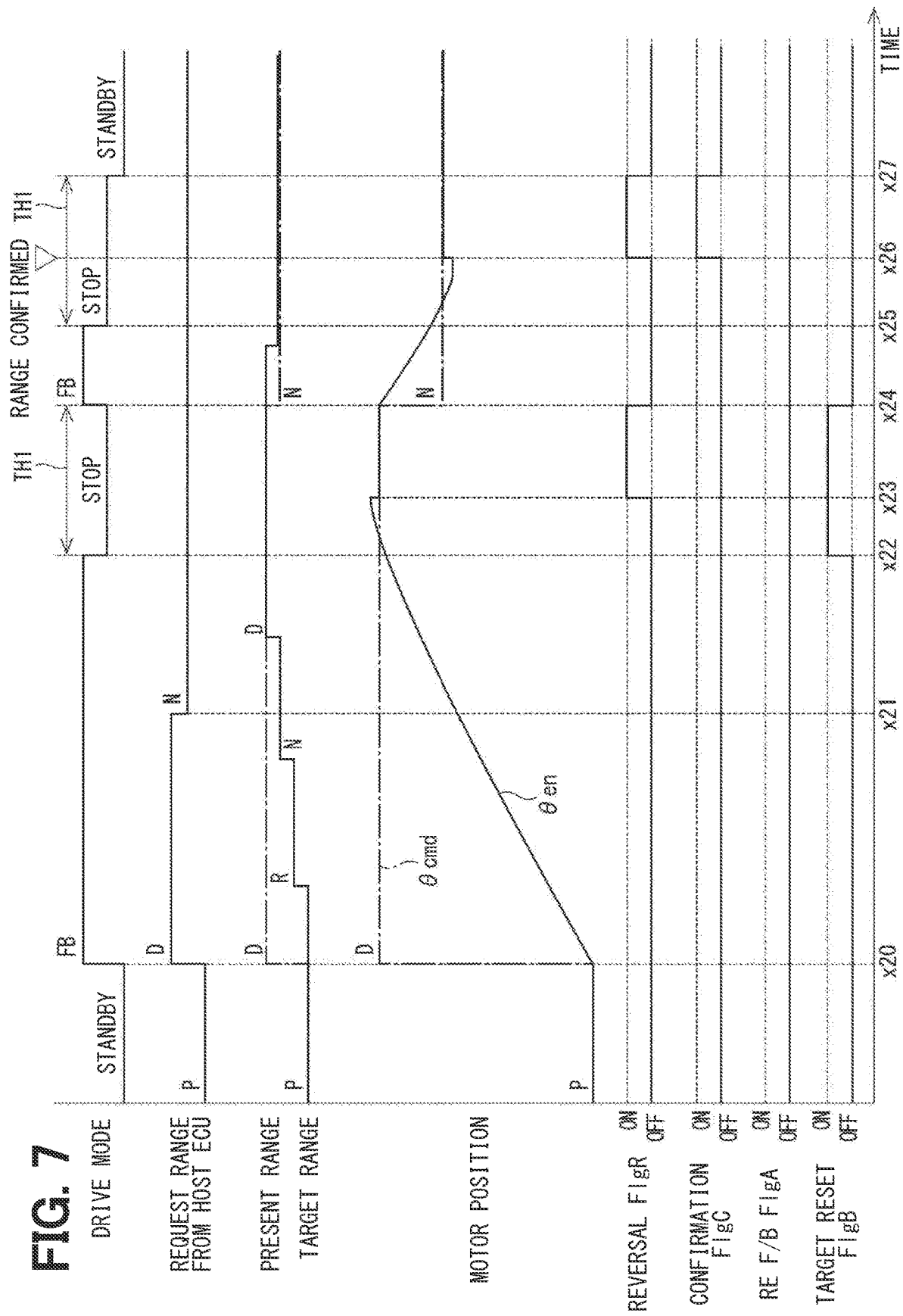
FIG. 7 is a flowchart showing the motor control process according to the first embodiment.

FIG. 7 shows a case where the required range is changed during range switching. The process at time x20 is the same as the process at time x10 in FIG. 6. In FIG. 7, the required range is changed from the D range to the N range at time x21 during the range switching.

When the encoder count value θen reaches the target at time x22, the drive mode is switched from the feedback mode to the stop mode. At this time, since the required range and the target range do not match, the target reset flag FlgB is turned on. Further, the motor 10 is reversed at time x23 during the stop control, and the reversal flag FlgR is turned on. However, since the target reset flag FlgB is on, the range confirmation flag FlgC is not turned on at this time, and the range is not confirmed.

Since the target reset flag FlgB is on at time x24 when the stop control continuation time TH1 has elapsed from the time when the stop control is started x22, the target range and the target count value θcmd are reset and the drive mode is changed to the feedback mode, and then the motor 10 drives. Also, the reversal flag FlgR and the target reset flag FlgB are turned off.

When the encoder count value θen reaches the control range including the newly set target count value θcmd at time x25, the drive mode is switched from the feedback mode to the stop mode. Further, when the reversal of the motor 10 is detected at time x26 in the stop mode, the reversal flag FlgR is turned on. At this time, since the re-feedback flag FlgA and the target reset flag FlgB are off, the range determination flag FlgC is turned on and transmitted to the host ECU 60. The processes of time x26 and time x27 are respectively the same as the processes of time x12 and time x13 in FIG. 6.

Figure 8:
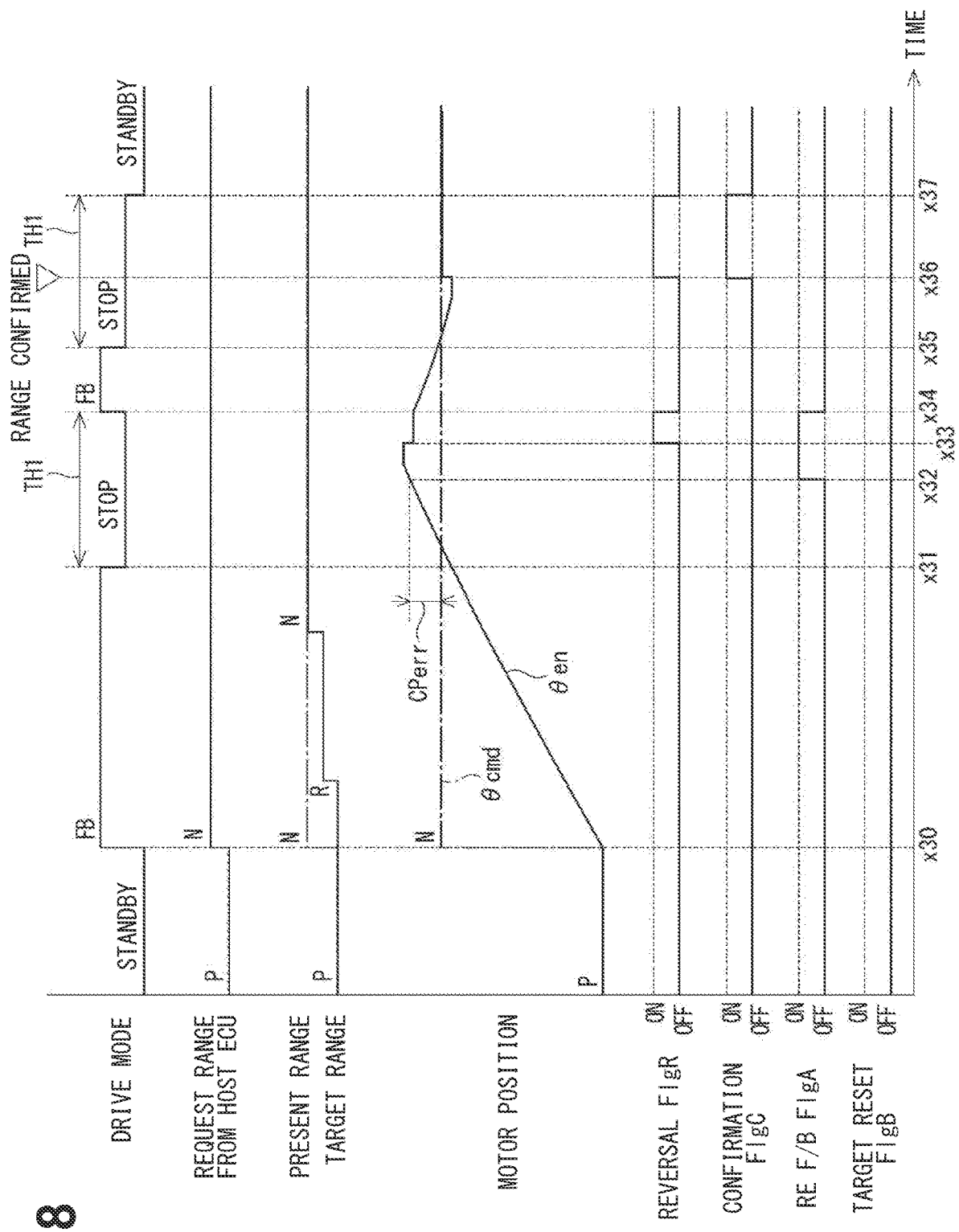
FIG. 8 is a time chart showing the motor control process according to the first embodiment.

FIG. 8 is an example of switching the shift range from the P range to the N range, and shows a case where an overshoot of the motor 10 occurs. The process from time x30 to time x31 is the same as the process from time x10 to time x11 in FIG. 6, except that each of the required range and the target range is the N range.

When the count deviation ΔCP becomes greater than the re-drive determination value CPerr due to the overshoot of the motor 10 at time x32 during the stop control, the re-feedback flag FlgA is turned on. Further, the motor 10 is reversed at time x33 during the stop control, and the reversal flag FlgR is turned on. However, since the re-feedback flag FlgA is on, the range confirmation flag FlgC is not turned on at this time, and the range is not confirmed.

Since the re-feedback flag FlgA is on at time x34 when the stop control continuation time T1 has elapsed from time x31 at which the stop control is started, the drive mode is switched to the feedback mode and the motor 10 is driven. Since the required range has not been changed, the target range and the target count value θcmd are not changed.

When the encoder count value θen reaches the control range including the target count value θcmd again at time x35, the drive mode is switched from the feedback mode to the stop mode. Further, when the reversal of the motor 10 is detected at time x36 in the stop mode, the reversal flag FlgR is turned on. At this time, since the re-feedback flag FlgA and the target reset flag FlgB are off, the range determination flag FlgC is turned on and transmitted to the host ECU 60. The processes of time x36 and time x37 are respectively the same as the processes of time x12 and time x13 in FIG. 6.

Figure 9:
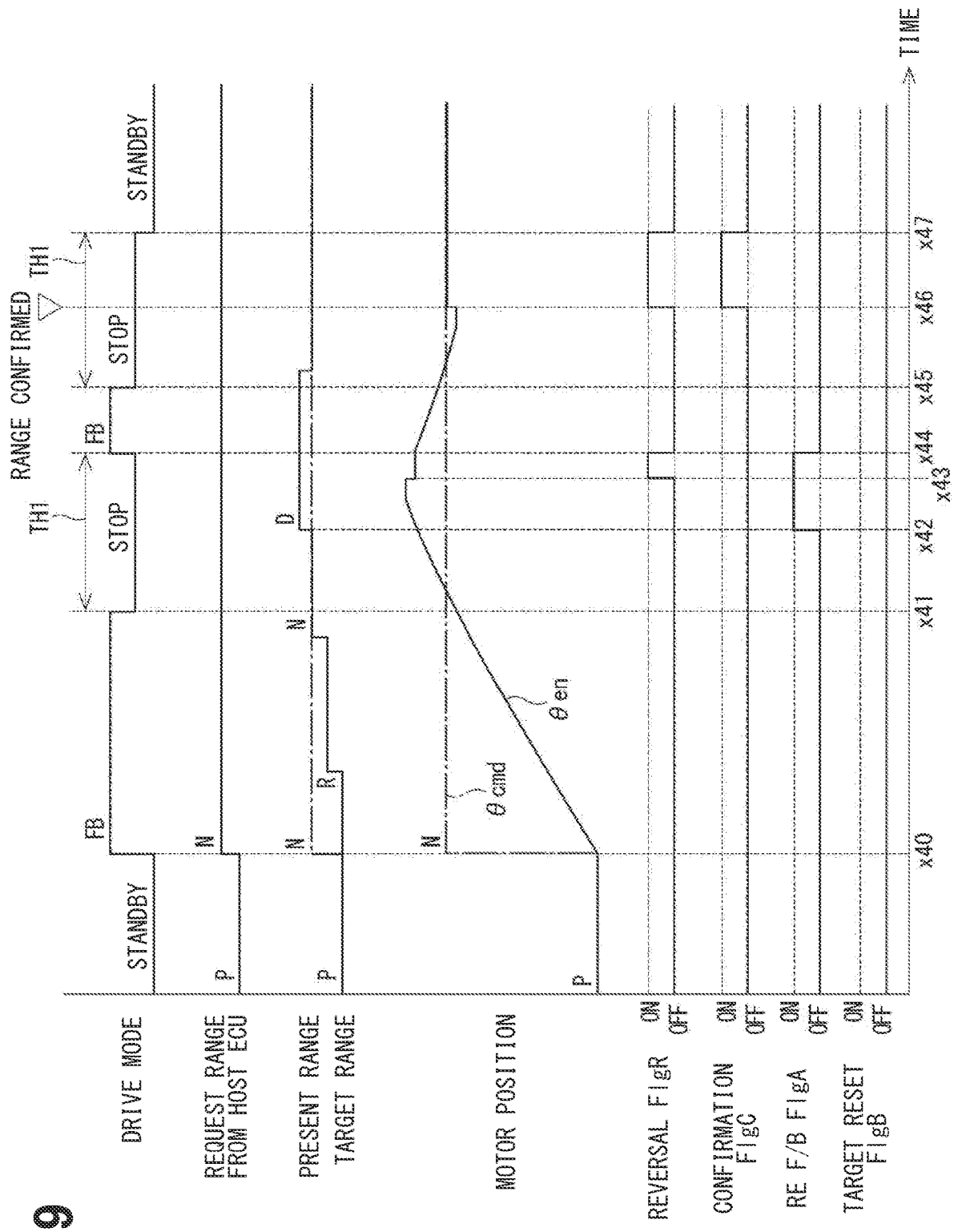
FIG. 9 is a time chart showing the motor control process according to the first embodiment.

FIG. 9 is an example of switching the shift range from the P range to the N range, and shows a case where an overshoot of the motor 10 occurs. The process from time x40 to time x41 is the same as the process from time x10 to time x11 in FIG. 6, except that each of the required range and the target range is the N range.

At time x42, the detent roller 26 moves to the valley portion 22 corresponding to the D range due to the overshoot of the motor 10. When the current range becomes the D range, the target range and the current range do not match, and thus the re-feedback flag FlgA is turned on. Further, the motor 10 is reversed at time x43 during the stop control, and the reversal flag FlgR is turned on. However, since the re-feedback flag FlgA is on, the range confirmation flag FlgC is not turned on at this time, and the range is not confirmed. The process of time x44 to time x47 is the same as the process of x34 to time x37 in FIG. 8.

Figure 10:
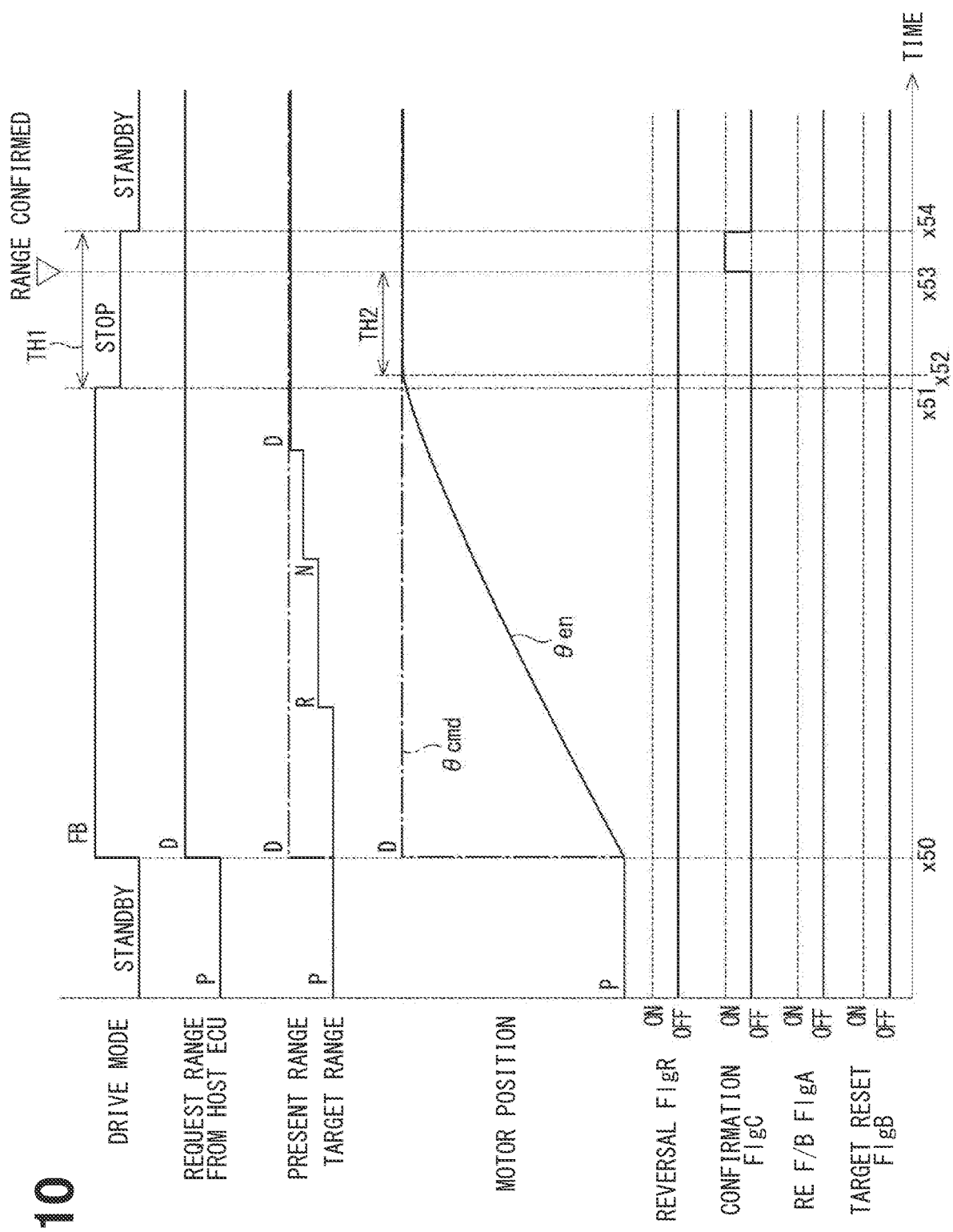
FIG. 10 is a time chart showing the motor control process according to the first embodiment.

FIG. 10 shows a case where the motor 10 is stopped without reversing. The processes of time x50 and time x51 are respectively the same as the processes of time x10 and time x11 in FIG. 6. When the encoder count value θen unchanges without the reversal of the motor 10 at time x52, the time counting of the encoder stationary time T2 is started. When the unchange of the encoder count value θen continues over the stationary determination time TH2, the range confirmation flag FlgC is turned on at time x53, at which the stationary determination time TH2 has elapsed from time x52, and then is transmitted to the host ECU 60.

At time x54 when the stop control continuation time TH1 elapses from time x51 at which the stop control is started, the stop control is terminated and the standby mode is entered. Also, the range confirmation flag FlgC is turned off. In the present embodiment, the stationary determination time TH2 is set shorter than the stop control continuation time TH1. Thus, even when the motor 10 stops within the control range without reversing, the start of the hydraulic control of the automatic transmission 5 can be accelerated, which contributes to the improvement of the feeling, as compared with the case where the range is confirmed at time x54 when the stop control is completed.

As described above, the shift range control device 40 according to the present embodiment switches the shift range by controlling driving of the motor 10, and includes the motor position calculation unit 51, the target setting unit 52, the mode selection unit 53, the drive control unit 54, the reversal determination unit 55, the range confirmation determination unit 56. The motor position calculation unit 51 calculates the encoder count value θen based on the detection value from the encoder 13 that detects the rotation of the motor 10. The target setting unit 52 sets the target range according to the required range and the target count value θcmd according to the target range. The drive control unit 54 controls the drive of the motor 10 so that the encoder count value θen becomes the target count value θcmd. When the encoder count value θen reaches the control range including the target count value θcmd, the drive control unit 54 causes the motor 10 to stop.

The reversal determination unit 55 detects the reversal of the motor 10. The range confirmation determination unit 56 determines that the shift range is confirmed according to the required range when the reversal of the motor 10 is detected during the stop control. In the present embodiment, attention is paid to the fact that overshoot does not occur if the motor reversal during stop control is detected. Thus, when the reversal is detected, it is determined that the shift range is confirmed. As a result, it is possible to appropriately determine the confirmation of the shift range. Further, for example, the range can be confirmed in a shorter time than when the range is confirmed after the stop control is completed. Further, by promptly confirming the range, the start of hydraulic control of the automatic transmission 5 can be accelerated, so that the driver's feeling can be improved.

When, in the stop control, the state that the encoder count value θen unchanges for the stationary determination time TH2, which is shorter than the stop control continuation time TH1 for continuing the stop control, the range confirmation determination unit 56 determines that the shift range according to the required range is confirmed. As a result, even when the rotor does not reverse, it is possible to appropriately determine the range confirmation.

When the required range does not match with the target range during the stop control, the ECU 50 resets the target range, re-drives the motor 10, and determines the range confirmation in a state where the required range matches with the target range. In other words, when the required range does not match with the target range, for example, when the required range is changed during range switching, the shift range is not confirmed and the motor 10 is re-driven even when the reversal of the motor 10 is detected during stop control. This configuration can prevent erroneous determination of the range confirmation.

When the required range does not match with the current range during the stop control, the ECU 50 re-drives the motor 10 and determines the range confirmation in the state where the required range matches with the current range. In other words, for example, when the target range does not match with the current target due to overshoot, the shift range is not confirmed and the motor 10 is re-driven even if the reversal of the motor 10 is detected during the stop control. This configuration can prevent erroneous determination of the range confirmation.

When the count deviation ΔCP, which is the deviation between the target count value θcmd and the encoder count value θen, is larger than the re-drive determination value CPerr during the stop control, the ECU 50 drives the motor 10 again and then determines the range confirmation in the state where the count deviation ΔCP is equal to or smaller than the re-drive determination value CPerr. In other words, for example, when the count deviation ΔCP becomes larger than the re-drive determination value CPerr due to overshoot, the shift range is not confirmed and the motor 10 is re-driven even if the reversal of the motor 10 is detected during the stop control. This configuration can prevent erroneous determination of the range confirmation.

When it is determined that the shift range corresponding to the required range is confirmed, the ECU 50 notifies the host ECU 60, which is another control unit, of information that the shift range has been confirmed. As a result, various processes executed by the range confirmation such as the hydraulic control of the automatic transmission 5 and notification to the user can be promptly started.

Second Embodiment

Figure 11:
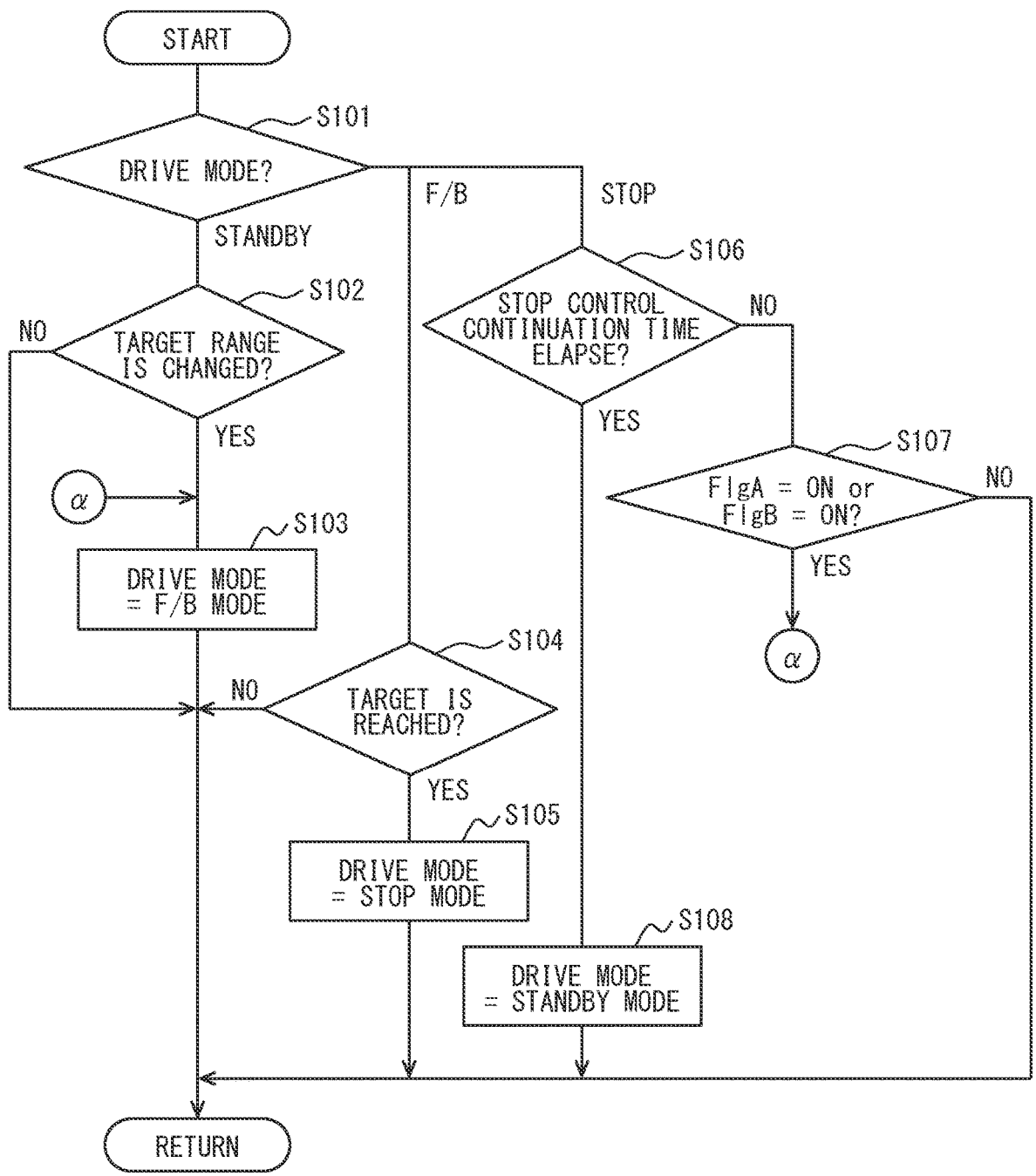
FIG. 11 is a flowchart showing a drive mode selection process according to a second embodiment.

A second embodiment is shown in FIG. 11. Since a drive mode selection process is different in this embodiment, this point will be mainly described. The drive mode selection process in the present embodiment will be described with reference to a flowchart of FIG. 11.

In the present embodiment, when it is determined in S106 that the stop control continuation time TH1 has not elapsed (S106: NO), the process proceeds to S107, and then it is determined whether the re-feedback flag FlgA or the target reset flag FlgB is turned on. When it is determined that the re-feedback flag FlgA or the target reset flag FlgB is on (S107: YES), the process proceeds to S103 and the drive mode is switched to the feedback mode. When it is determined that both the re-feedback flag FlgA and the target reset flag FlgB are off (S107: NO), the stop control is continued.

That is, in the present embodiment, when the required range is changed during the range switching or when the motor 10 overshoots, the feedback mode is switched without waiting for the stop control continuation time TH1 to elapse. The same effects as those of the above embodiments can be obtained even in the configuration described above.

In the embodiment, the encoder 13 corresponds to a "rotation position detection unit", the host ECU 60 corresponds to "another control unit", the encoder count value θen corresponds to an "actual rotation position", the target count value θcmd corresponds to a "target rotation position", the count deviation ΔCP corresponds to a "deviation between the target rotation position and the actual rotation position", and the range confirmation flag FlgC corresponds to "information that the shift range has been confirmed".

OTHER EMBODIMENTS

In the above embodiment, the rotation position detection unit is an encoder. In another embodiment, the rotation position detection unit may be a linear sensor such as a resolver as long as it can detect the rotation position of the rotor. In the above embodiments, the potentiometer is exemplified as the output shaft sensor. In other embodiments, the output shaft sensor may be something other than a potentiometer, or the output shaft sensor may be omitted.

In the above embodiments, the motor is a switched reluctance motor. In other embodiments, the motor may be something other than a switched reluctance motor, for example, a DC brushless motor or the like. According to the embodiments described above, the four valley portions are formed in the detent plate. As another embodiment, the number of the valley portions is not limited to four but may be any number. For example, the detent plate may have two valley portions and the P range and the NotP range may be switched. The shift range switching mechanism, the parking lock mechanism, and the like may be different from those of the above embodiment.

In the embodiment described above, the speed reducer is provided between the motor shaft and the output shaft. Although the detail of the speed reducer is not mentioned in the above-described embodiments, the speed reducer may have any configuration, such as one using a cycloid gear, a planetary gear, or a spur gear that transmits a torque from a speed reduction mechanism substantially coaxial with the motor shaft to the drive shaft, and one using these gears in combination. In another embodiment, the speed reducer between the motor shaft and the output shaft may be omitted, or a mechanism except for the speed reducer may be provided.

The control unit and the technique according to the present disclosure may be achieved by a dedicated computer provided by constituting a processor and a memory programmed to execute one or more functions embodied by a computer program. Alternatively, the control circuit and the method described in the present disclosure may be realized by a dedicated computer configured as a processor with one or more dedicated hardware logic circuits. Alternatively, the control circuit and method described in the present disclosure may be realized by one or more dedicated computer, which is configured as a combination of a processor and a memory, which are programmed to perform one or more functions, and a processor which is configured with one or more hardware logic circuits. The computer programs may be stored, as instructions to be executed by a computer, in a tangible non-transitory computer-readable medium. As described above, the present disclosure is not limited to the embodiments described above, and can be implemented in various forms without departing from the spirit of the present disclosure.

The present disclosure has been described in accordance with the embodiments. However, the present disclosure is not limited to such embodiments and structures. The present disclosure also encompasses various modifications and variations within the scope of equivalents. Furthermore, various combination and formation, and other combination and formation including one, more than one or less than one element may be made in the present disclosure.

What is claimed is:

1. A shift range control device configured to switch a shift range by controlling driving of a motor, the shift range control device comprising:
    a motor position calculation unit configured to calculate an actual rotation position based on a detection value of a rotation position detection unit that detects a rotation of the motor;
    a target setting unit configured to set a target range according to a required range and a target rotation position according to the target range;
    a drive control unit configured to control the driving of the motor such that the actual rotation position reaches the target rotation position, and perform a stop control that causes the motor to stop in response to the actual rotation position being within a control range including the target rotation position;
    a reversal determination unit configured to detect a reversal of the motor; and
    a range confirmation determination unit configured to determine that the shift range is confirmed according to the required range when the reversal of the motor is detected during the stop control.

2. The shift range control device according to claim 1, wherein
    the range confirmation determination unit determines that the shift range is confirmed according to the required range when the actual rotation position unchanges, during the stop control, for a stationary determination time shorter than a stop control continuation time for continuing the stop control.

3. The shift range control device according to claim 1, wherein
    when the target range mismatches with the required range during the stop control, the target range is reset, the motor is caused to drive again, and thereafter the range confirmation determination unit determines that the shift range is confirmed in a state where the required range matches with the target range.

4. The shift range control device according to claim 1, wherein
    when a current range mismatches with the target range during the stop control, the motor is caused to drive again and thereafter the range confirmation determination unit determines that the shift range is confirmed in a state where the target range matches with the current range.

5. The shift range control device according to claim 1, wherein
    when a deviation between the target rotation position and the actual rotation position is greater than a re-drive determination value during the stop control, the motor is caused to drive again and thereafter the range confirmation determination unit determines that the shift range is confirmed in a state where the deviation is equal to or smaller than the re-drive determination value.

6. The shift range control device according to claim 1, wherein when the range confirmation determination unit determines that the shift range is confirmed according to the required range, another control unit is notified of information that the shift range is confirmed.

7. A shift range control device comprising:

a processor configured to:
- switch a shift range by controlling driving of a motor;
- calculate an actual rotation position based on a detection value of an encoder that detects a rotation of the motor;
- set a target range according to a required range and a target rotation position according to the target range;
- control the driving of the motor such that the actual rotation position reaches the target rotation position;
- perform a stop control that causes the motor to stop in response to the actual rotation position being within a control range including the target rotation position;
- detect a reversal of the motor; and
- determine that the shift range is confirmed according to the required range when the reversal of the motor is detected during the stop control.

* * * * *